(12) United States Patent
Zhong et al.

(10) Patent No.: US 12,135,702 B2
(45) Date of Patent: Nov. 5, 2024

(54) COMPARISON OF DATABASE DATA

(71) Applicant: International Business Machines Corporation, Armonk, NY (US)

(72) Inventors: Jia Tian Zhong, Beijing (CN); Xing Xing Shen, Beijing (CN); Peng Hui Jiang, Beijing (CN); Cai Zhou, Wuxi (CN); Dong Hui Liu, Beijing (CN); Jia Yu, Beijing (CN); Yong Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 17/016,431

(22) Filed: Sep. 10, 2020

(65) Prior Publication Data

US 2022/0075764 A1    Mar. 10, 2022

(51) Int. Cl.
*G06F 16/22* (2019.01)
*G06F 16/215* (2019.01)
*G06F 16/23* (2019.01)

(52) U.S. Cl.
CPC ...... *G06F 16/2246* (2019.01); *G06F 16/2255* (2019.01); *G06F 16/2282* (2019.01); *G06F 16/2379* (2019.01)

(58) Field of Classification Search
CPC ............. G06F 16/2246; G06F 16/2255; G06F 16/2282; G06F 16/2379; G06F 16/2365; G06F 16/215
See application file for complete search history.

(56) References Cited

U.S. PATENT DOCUMENTS

| 7,680,833 B1* | 3/2010 | Cole ...................... G06F 16/27 |
| | | 707/999.201 |
| 9,390,120 B1* | 7/2016 | Gulliver .............. G06F 16/2365 |
| 9,569,326 B2* | 2/2017 | Gagliardi ............ G06F 11/3006 |
| 10,169,379 B2 | 1/2019 | Simon |
| 10,248,693 B2 | 4/2019 | Mittal |

(Continued)

FOREIGN PATENT DOCUMENTS

| CN | 101236554 B | 5/2011 |
| CN | 103970792 A | 8/2014 |

(Continued)

*Primary Examiner* — Robert W Beausoliel, Jr.
*Assistant Examiner* — Mohammad S Bhuyan
(74) *Attorney, Agent, or Firm* — Caleb D. Wilkes

(57) ABSTRACT

Embodiments of the present disclosure relate to a method, system, and computer program product for comparison of database data. According to the method, a first tree structure corresponding to first data segments of first database data and a second tree structure corresponding to second data segments of second database data are at least partially obtained. Each node of the first or second tree structure indicating a characteristic value of at least one of the first or second data segments, and nodes of the first or second tree structure are divided into a first or second plurality of branches from a first or second root node based on update frequencies of the first or second data segments. A difference between the first data segments and the second data segments is determined by at least comparing characteristic values indicated by nodes in the obtained parts of the first and second tree structures.

18 Claims, 11 Drawing Sheets

(56) References Cited

U.S. PATENT DOCUMENTS

| | | | | |
|---|---|---|---|---|
| 2002/0055932 | A1* | 5/2002 | Wheeler | G06F 16/25 |
| 2005/0010732 | A1* | 1/2005 | Boyd | G06F 11/2064 |
| | | | | 714/E11.107 |
| 2006/0106832 | A1* | 5/2006 | Ben-Dyke | G06F 16/2246 |
| 2009/0100053 | A1* | 4/2009 | Boschee | G06F 16/334 |
| 2009/0187585 | A1* | 7/2009 | Mathur | G06F 40/143 |
| | | | | 707/E17.127 |
| 2010/0257149 | A1* | 10/2010 | Cognigni | G06F 16/27 |
| | | | | 711/216 |
| 2011/0258209 | A1* | 10/2011 | Gagliardi | G06F 11/3072 |
| | | | | 709/224 |
| 2014/0122430 | A1* | 5/2014 | Dary | G06F 16/219 |
| | | | | 707/624 |
| 2016/0275150 | A1* | 9/2016 | Bournonnais | G06F 16/25 |
| 2017/0177695 | A1* | 6/2017 | Ritter | G06F 16/2255 |
| 2018/0011893 | A1 | 1/2018 | Kimura | |
| 2018/0025016 | A1* | 1/2018 | Hassan | G06F 16/2246 |
| | | | | 707/722 |
| 2018/0075101 | A1 | 3/2018 | Amor | |
| 2019/0205429 | A1* | 7/2019 | Lee | G06F 16/128 |
| 2019/0278504 | A1* | 9/2019 | Matsui | G06F 3/0608 |
| 2021/0191903 | A1* | 6/2021 | Shetty | G06F 16/9027 |
| 2021/0279248 | A1* | 9/2021 | Gandhi | H04L 63/1458 |
| 2021/0409277 | A1* | 12/2021 | Jeuk | H04L 41/14 |
| 2022/0043799 | A1* | 2/2022 | Liao | G06F 11/1451 |
| 2022/0043926 | A1* | 2/2022 | Saad | H04L 63/0853 |

FOREIGN PATENT DOCUMENTS

| | | |
|---|---|---|
| CN | 105653554 B | 7/2019 |
| WO | WO-2017036211 A1 * | 3/2017 |

\* cited by examiner

COMPARISON OF DATABASE DATA

BACKGROUND

The present disclosure generally relates to computer techniques and more particularly, to a method, system, and computer program products for comparing database data.

The entry for database in the Wikipedia, as of 24 Jun. 2020, states in part as follows: "A database is an organized collection of data, generally stored and accessed electronically from a computer system. Where databases are more complex they are often developed using formal design and modeling techniques. The database management system (DBMS) is the software that interacts with end users, applications, and the database itself to capture and analyze the data. The DBMS software additionally encompasses the core facilities provided to administer the database. The sum total of the database, the DBMS and the associated applications can be referred to as a 'database system.'" (footnotes omitted)

Typically, databases are made up of a multiple records and each record is made up of multiple field values, respectively corresponding to fields. For example, a simple database may include records for three people: Abel, Baker and Charlie. In this simple example, each record includes three fields: name, eye color and favorite flavor of pie. The field values for Abel's record are: (i) ABEL; (ii) brown; and (iii) pumpkin. The field values for Baker's record are: (i) BAKER; (ii) green; and (iii) chicken pot pie. The field values for Charlie's record are: (i) CHARLIE; (ii) blue; and (iii) mince. Like many databases, this database may be represented as a table, with the field values arranged in a matrix of rows and columns. Typically, each column is a different field (for example, name, eye color and favorite pie), and each row is a record (for example, one row for Abel's field values, one row for Baker's field values and one row for Charlie's field values).

It is known that the data of a database can be searched using a type of request called a search query. Some search queries are written according to a predefined syntax and grammar (which is sometimes called a "query language"). Search queries may be generated by human users or by machine logic (for example, artificial intelligence software). Using the simple example database of the previous paragraph, a search query to locate all field values that begin with the letter "B," would yield the following three search results: (i) "brown" at the first row, second column; (ii) "Baker" at the second row, first column; and (iii) "blue" at third row, second column. "Data segment" is herein defined to be the (non-null) set of field value(s) that are responsive to a query. In a database that can be represented as a table (herein sometimes referred to as a "tabular database"), the "data segment" is the set of cells that are responsive to a query. Queries for tabular databases (for example, standard query language queries) are often delimited to a single column of field values (for example, the eye color column values in the tabular database described above).

SUMMARY

According to one embodiment of the present disclosure, there is provided a computer-implemented method. According to the method, at least one part of a first tree structure corresponding to first data segments of first database data is obtained. Each node of the first tree structure indicate a characteristic value of at least one of the first data segments, and nodes of the first tree structure are divided into a first plurality of branches from a first root node based on update frequencies of the first data segments. At least one part of a second tree structure corresponding to second data segments of second database data is obtained. Each node of the second tree structure indicate a characteristic value of at least one of the second data segments, and nodes of the second tree structure are divided into a second plurality of branches from a second root node based on update frequencies of the second data segments. A difference between the first data segments and the second data segments is determined by at least comparing characteristic values indicated by nodes included in the at least one part of the first tree structure and characteristic values indicated by nodes included in the at least one part of the second tree structure.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
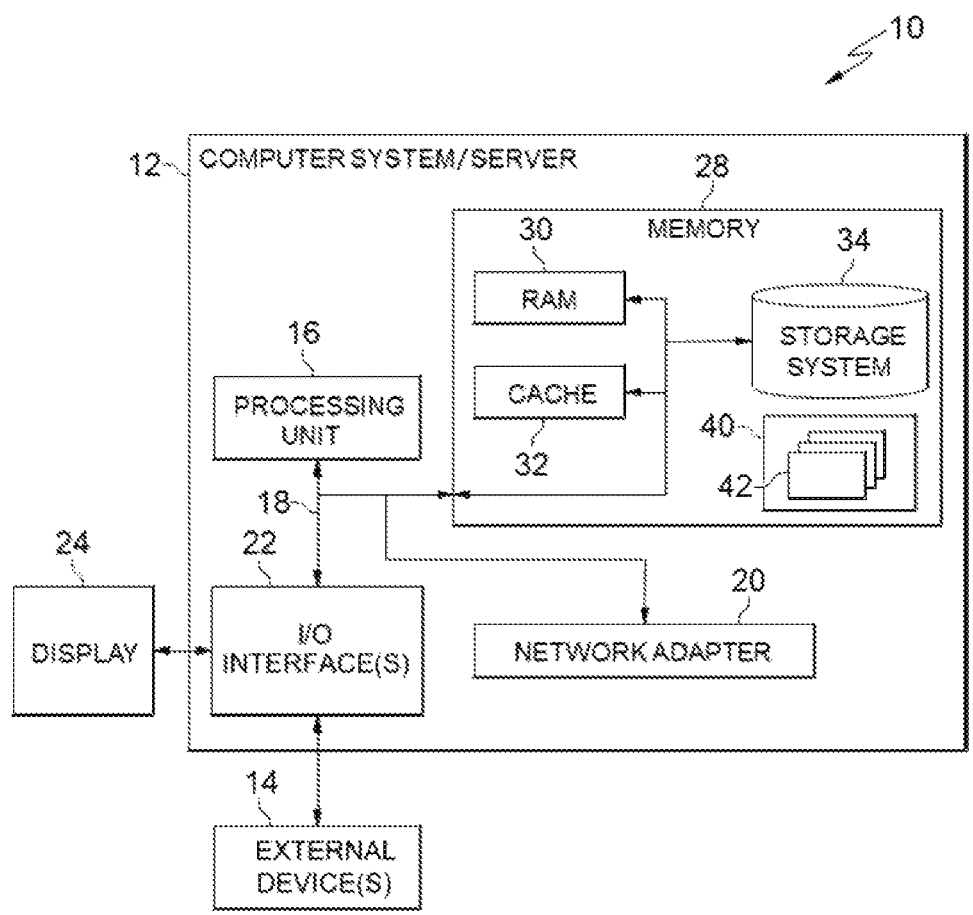
FIG. 1 depicts a cloud computing node according to some embodiments of the present disclosure.

Some embodiments of the present invention may recognize one, or more, of the following problems, shortcomings, opportunities for improvement and/or challenges with respect to the current state of the art: (i) database sizes continue to grow as the availability and cost per unit storage of disk-based storage and system memory decreases; (ii) in general, a database can feature on-disk storage of data, in which data or contents are stored in one or more tables or other database structures; (iii) in a complex database environment such as active-to-active or multi-node distributed database environment, database data comparison is a necessary feature used to validate whether data from different system nodes are in synchronization; and/or (iv) the foregoing item on this list is especially applicable after storage nodes are recovered from an outage or after data replication or backup is performed.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
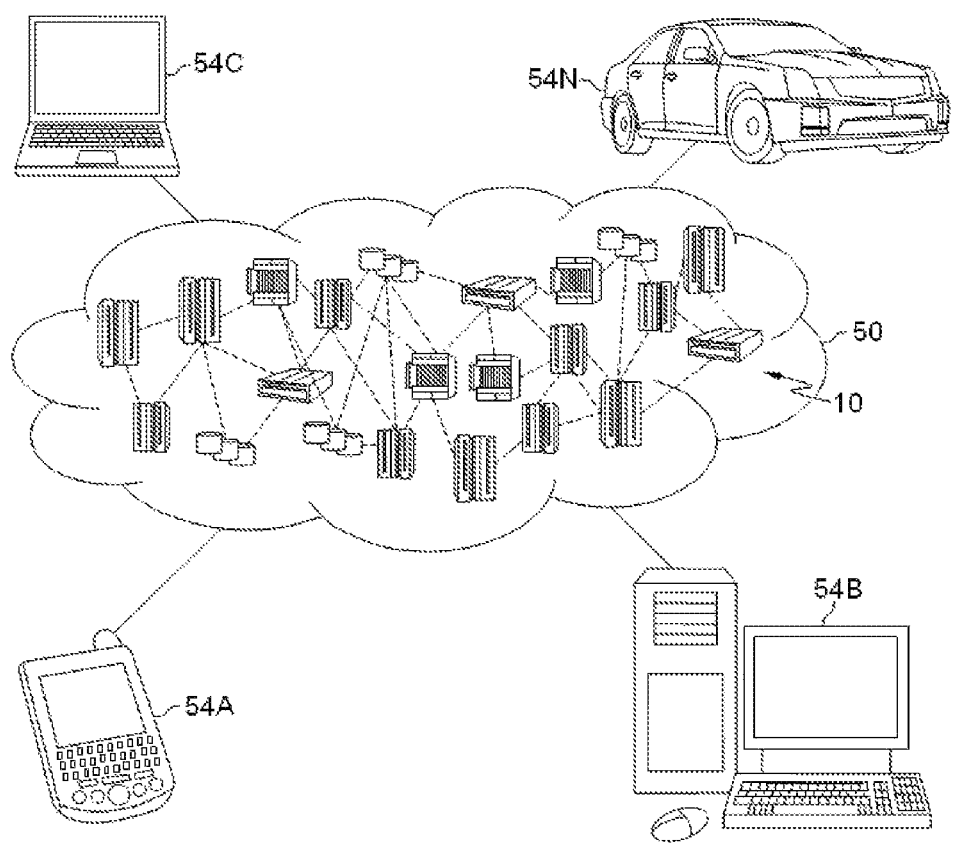
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
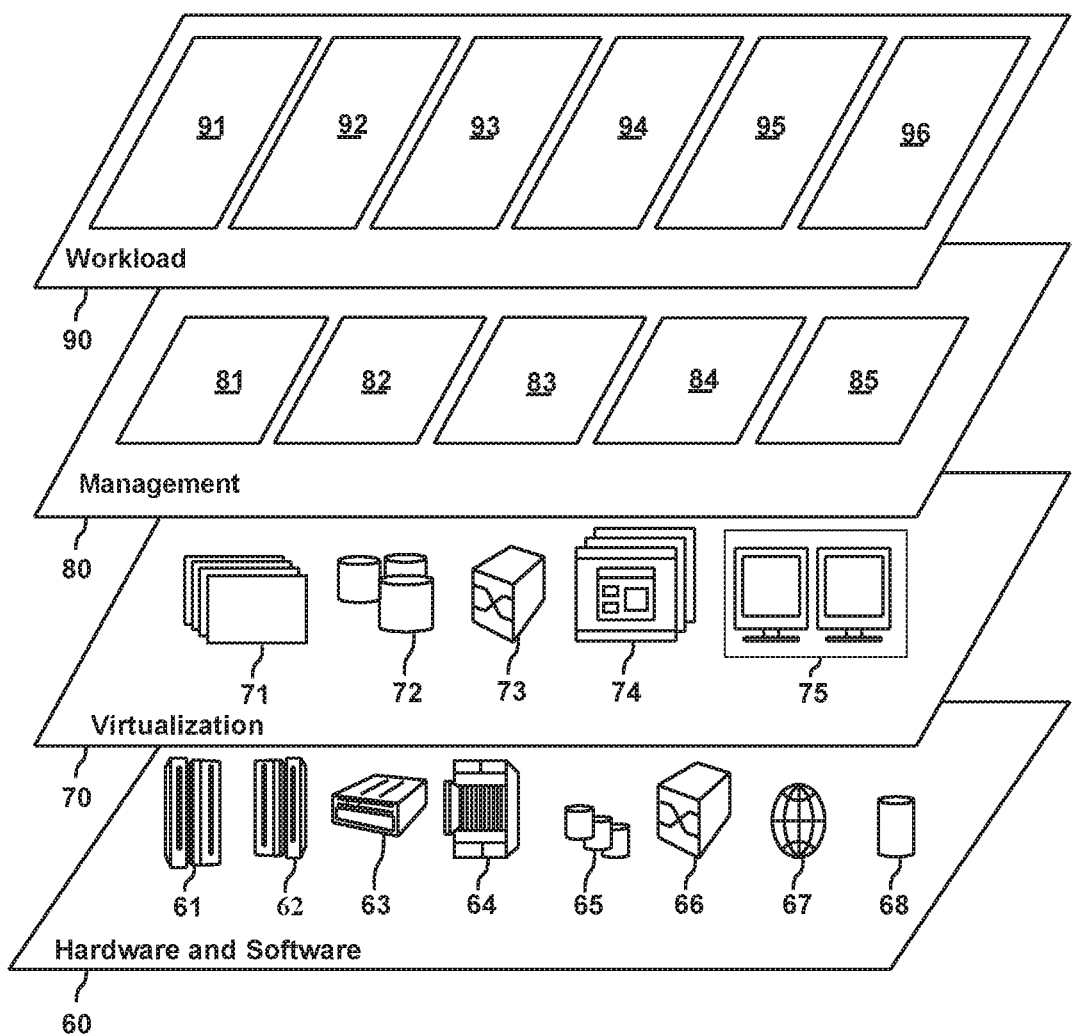
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database data comparison 96. The functionalities of database data comparison 96 will be described in the following embodiment of the present disclosure.

In a database environment, data comparison is required to validate data consistency and synchronization. Some solutions are provided to enable the comparison. According to the Structured Query Language (SQL) provided on relational databases, one of the solutions is to apply the operators, such as "MINUS" and "UNION" operators, using a formula represented as "(A−B)+(B−A)," where "A" and "B" represents data tables from two sources to be compared. Those operations require row-by-row or column-by-column comparison of the data tables. Another solution is to directly group two data tables on a primary key using the "UNION" operator and determine whether one of the groups having different counts of rows or columns. In some other solutions, hash values of the whole rows or columns of different data tables may be calculated and compared to determine the different rows or columns. Similar precise comparison or checksum comparison may be performed on non-relational databases.

The above solutions result in high time consumption and provide low efficiency, especially for large database data or when a large number of databases are to be compared. Moreover, those solutions are all performed at an application level and thus database data have to be read from storage nodes for calculation and/or comparison, which may further increase the time consumption and access resource consumption.

There exists a need to provide for efficient database comparison with high accuracy instead of row-by-row or column-by-column based comparison (for example, using raw data or checksum/hash values).

According to example embodiments of the present disclosure, there is proposed a solution for comparison of database data. In this solution, a tree structure is created. The tree structure includes nodes indicating characteristic values of different ones of data segments (see definition of "data segment," above, in the Background section) among database data and have different branches from a root node based on update frequencies of the data segments. To perform comparison of database data, a first tree structure corresponding to first data segments and a second tree structure corresponding to second data segments are compared with each other to determine whether the first data segments are different from the second data segments.

Through this solution, by comparing the tree structures instead of reading and comparing the data segments, the comparison efficiency can be significantly improved with low complexity and it is possible to accurately localize the different data segments. Creating the tree structures based on the update frequencies can further help improve the efficiency as data segments changed frequently can be grouped into a certain branch or branches to shorten the time consumption for tree traverse.

Other advantages of the present disclosure will be described with reference to the example embodiments and the accompanying drawings below.

Figure 4A:
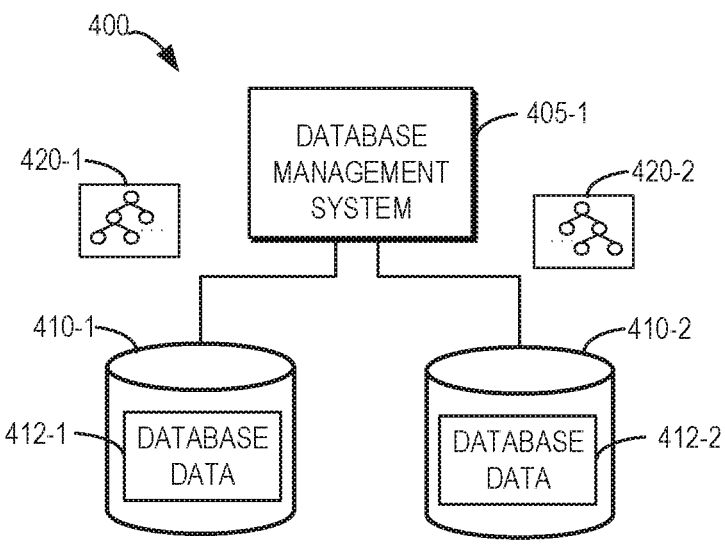
FIGS. 4A-4B depict block diagrams of example environments in which database data comparison can be performed according to some embodiments of the present disclosure.
Figure 4B:
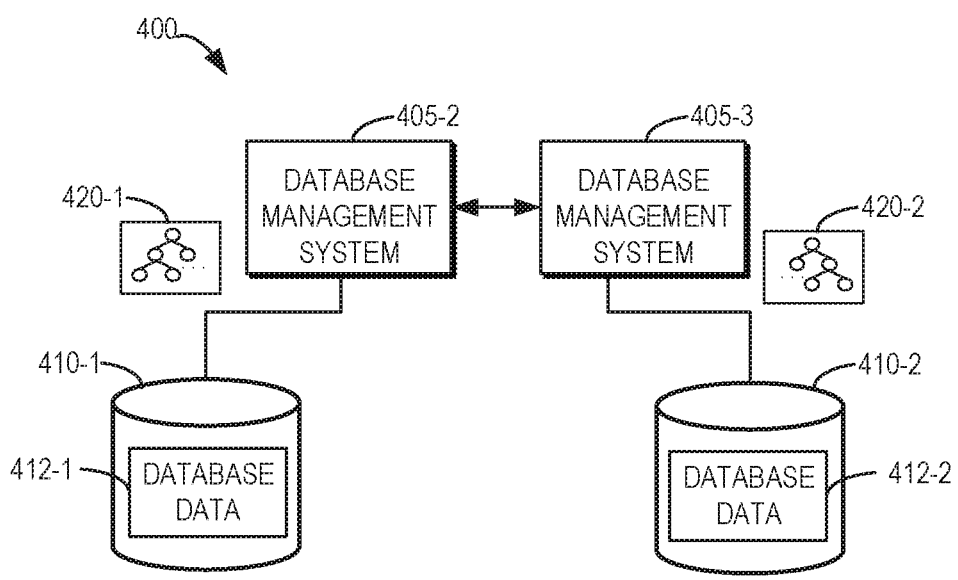

Reference is now first made to FIGS. 4A-4B, which illustrate block diagrams of some examples of an environment in which database data comparison can be performed according to some embodiments of the present disclosure. In an environment 400 shown in FIG. 4A, a central database management system 405-1 is configured to manage a plurality of databases 410-1, 410-2, each of the databases storing database data 412-1, 412-2. The database management system 405-1 may be connected to the databases 410-1, 410-2 via wired, wireless, and/or fiber optical connections.

In some implementations, the databases 410-1, 410-2 may be managed in a discrete manner as shown in the example of FIG. 4B. In this example, two separate database management systems 405-2, 405-3 are included in the environment 400, each configured to manage one of the databases 410-1, 410-2. The separate database management systems 405-2, 405-3 may be connected to the databases 410-1, 410-2, respectively via wired, wireless, and/or fiber optical connections. The separate database management systems 405-2, 405-3 may also communicate with each other, including coordinate information or data therebetween.

In either the centralized management environment shown in FIG. 4A or the discrete management environment shown in FIG. 4B, any of the database management systems 405-1, 405-2, 405-3 can implement the database data comparison according to the embodiments of the present disclosure. As compared with the central database management system 405-1, if the database data comparison is performed at any one of the separate database management systems 405-2, 405-3, some data or information used for the comparison may need to be requested from the other one.

For each of following discussion, the central database management system 405-1 and the database management systems 405-2, 405-3 may be collectively or individually referred to as database management systems 405. In the following, if not specifically indicated using numerical references "405-1, 405-2, 405-3," the functionalities or operations described from the perspective of "the database management system 405" in the following can be implemented at any of the central database management system 405-1 and the separate database management systems 405-2, 405-3.

Herein, the databases 410-1, 410-2 may sometimes be referred to as first database and second database, respectively, and the database data 412-1, 412-2 may sometimes be referred to as first database data and second database data.

For ease of discussion, the databases 410-1, 410-2 may be collectively or individually referred to as databases 410, and the database data 412-1, 412-2 may be collectively or individually referred to as database data 412. The databases 410 may be constructed according to any type of databases, including relational database or non-relational databases. The relational database may support SQL, while the non-relational databases may support NoSQL.

In some embodiments, the database management system 405 may be implemented by computer system/server 12 of FIG. 1. It would be appreciated that although two databases are illustrated in FIGS. 4A-4B, there may be one or more other databases managed by the database management system 405.

In embodiments of the present disclosure, the database management system 405 is configured to implement comparison of database data stored in different databases. In particular, the database management system 405 is configured to determine whether a difference exists between the database data 412-1 and 412-2 or between some parts of the database data 412-1 and 412-2. The comparison may be automatically initiated by the database management system 405 periodically or in response to certain events. For example, the events may include recovery of the storage nodes for the database 410-1 or 410-2 from an outage, data replication or backup performed between the databases 410-1 and 410-2, and/or other possible events. In some embodiments, the comparison may be initiated by user queries.

To determine the difference between the database data 412-1 and 412-2 or between some parts of the database data 412-1 and 412-2, instead of directly comparing the database data or their corresponding parts, a special type of tree structure is introduced in the embodiments of the present disclosure to help find out whether the difference exists. Specifically, a tree structure 420-1 corresponding to data segments of the database data 412-1 and a tree structure 420-2 corresponding to data segments of the database data 412-2 are created. Herein, the tree structures 420-1, 420-2 may sometimes be referred to as a first tree structure and a second tree structure, respectively. In the centralized management environment, the tree structures 420-1, 420-2 may be created and maintained by the database management system 405-1, while in the discrete management environment, the tree structures 420-1, 420-2 may be created and maintained by the database management systems 405-2, 405-3, respectively.

The database management system 405, at which the comparison is initiated, obtains partially or entirely the tree structures 420-1, 420-2 for comparison so as to determine whether a difference exists between the corresponding data segments of the database data 412-1 and the corresponding data segments of the database data 412-2. In the discrete management environment, one of the database management systems 405-2, 405-3 may request for the tree structure 412 maintained at the other database management system 405-2 or 405-3 for use. The tree structure 412 may be conveyed to the requesting database management system all at once, or each time only a part of the tree structure 412 is provided as the comparison requires. The latter case will be better understood in the following detailed description of the tree structure-based comparison.

The data segments corresponding to the tree structure 420-1 may sometimes be referred to as first data segments, while the data segments corresponding to the tree structure 420-2 may sometimes be referred to as second data segments. For ease of discussion, the tree structures 420-1, 420-2 may be collectively or individually referred to as tree structures 420. Before describing the tree structure-based comparison, the creation of the tree structures 420 will be discussed first. In the following embodiments, it would be appreciated that the creating of a tree structure as well its subsequent updating are applied for each of the tree structures 420-1, 420-2.

A tree structure 420 is a hierarchical representation of linked nodes, where each of the nodes is associated with a set of one or more data segments in the corresponding database data 412 and indicates a characteristic value of the associated set of one or more data segments. The characteristic value of each node may be determined directly or indirectly from the data segments. Before the tree structure 420 is described in detail, the database data 412 is first described to better illustrate the data segments that are used to create the tree structure 420.

In some embodiments, a data segment in the database data 412 may comprise all data or partial data in a data access unit of the database data 412. A data access unit means that data is read from and/or wrote to the database 410 in this unit.

Figures 5A, 5B:
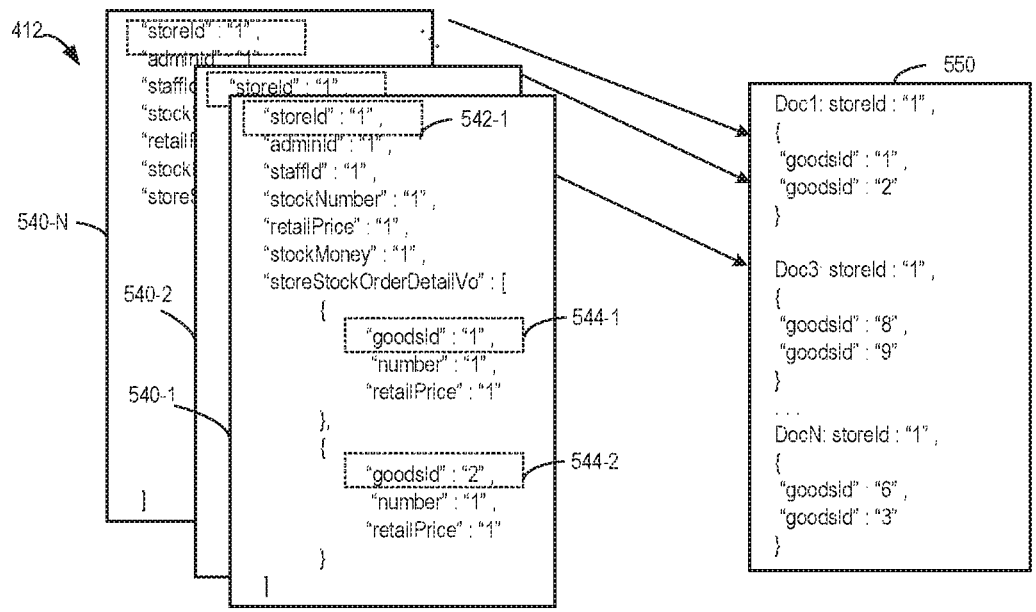
FIGS. 5A-5B depicts examples of database data according to some embodiments of the present disclosure.

In a relational database, relational database data 412 are stored into tables, and a data access unit of the database data 412 may include rows or columns of the tables. The table may include user data or content or include attributes of the user data or content (also referred to as a database schema or metadata). FIG. 5A illustrates an example of the database data 412 in a form of table in the relational database, where data are stored in rows and columns of the table, each column and each column defining one data item.

In the case that the databases 410 are relational databases, a data segment 412 may be a row or a column of a table of the database data 412. In some embodiments, the data segments used to create the tree structure 420 may include all the rows or columns of one or more certain tables of the database data 412, such as all the rows or columns in the table shown in FIG. 5A. As such, a difference between the tables in the database data 412-1 and 412-2 can be determined using the tree structures. In some embodiments, the data segments used to create the tree structure 420 may include a subset of all the rows or columns of one or more certain tables. In an embodiment, each data segment may include all data items in one row or column. For example, in FIG. 5A, a tree structure 420 may be created on three rows 510, 511, 512, or created on two columns 520, 521. In some cases, each data segment may include a subset of the data items in one row or column. For example, in FIG. 5A, a tree structure 420 may be created on six data items 531 to 536, which are defined by the rows 510, 511, 512 and the columns 520, 521.

If the databases 410 are non-relational databases, non-relational database data 412 are stored as data records defined by data fields, and a data access unit of the database data 412 may include a data field which may be indexed by certain keys and have corresponding values. FIG. 5B illustrates an example of the database data 412 in the non-relational database, where data are stored in a plurality of documents 540-1, 540-2, . . . , 540-N (where N is an integer larger than or equal to one), which are collectively or individually referred to as documents 540. Data fields are contained in the documents 540 indexed with keys such as "storeId," "adminId," . . . , "goodsId," and so on.

In some embodiments, the data segments used to create the tree structure 420 may include all or a subset of the data fields in the non-relational database data, including all the values in the corresponding data fields. In some embodiments, the data segments used to create the tree structure 420 may include a subset of values indexed by certain keys in some data field. In the example shown in FIG. 5B, a data segment may be determined as a subset of values indexed by the keys "storeId" and "goodsId" in a data field. For examples, the keys and values 542-1, 544-1, 544-2 in the document 540-1 are highlighted with boxes. A collection 550 of data segments indexed by those keys among the database data 412 is illustrated.

It is noted that corresponding data segments are selected from the database data 412-1, 412-2 for the purpose of comparison. In either relational databases or non-relational databases, the selection of the data segments used to create the tree structures 420 may be automatically determined or may be specified by a user. In some embodiments, the user may want to find out a difference between a subset of data items in certain rows or columns in the relational database data 412-1, 412-2. The tree structures 420-1, 420-2 may be generated accordingly. As such, when a user query is received from the user, the tree structures 420-1, 420-2 may be used to determine the difference.

In some embodiments, the database management system 405 may automatically analyze the database data 412 and decide which data segments are selected to generate the two tree structures 420. The database management system 405 may perform the analysis by determining update changes of data segments in the database data 412 and/or by determining expected user preference. If some rows or columns or some data items in a table are determined to change infrequently or be unchanged for a long period, the database management system 405 may omit such rows, columns or data items in generating the tree structures 420.

It would be appreciated that the tree structures 420 may be generated based on data segments selected according to any other criteria. In some embodiments, for more than one pair of tree structures may be generated based on different sets of data segments in each database 410. For example, two tree structures corresponding to a first set of data segments in the database data 412-1 and a second set of corresponding data segments in the database data 412-2 may be created respectively. Additionally, two further tree structures corresponding to a third set of data segments in the database data 412-1 and a fourth set of corresponding data segments in the database data 412-2 may be created, respectively. The third set is different from the first set, and thus, the fourth set is different from the second set. A pair of tree structures may be obtained for use if it is expected to determine a difference between the corresponding data segments in the database data 412-1, 412-2.

In embodiments of the present disclosure, by selecting the data segments in the databases 410 to generate the tree structures 420, the tree structures 420 may enable comparison of specified parts of the database data, such as comparison of a subset of columns or rows or a subset of data items in certain columns or rows in the case of relational database, or parts of fields in the case of the non-relational database.

As mentioned briefly, each node in a tree structure 420 indicates a characteristic value of a set of one or more data segments. As used herein, a characteristic value uniquely represents data in the set of one or more data segments, for example, representing an arrangement of bits in a binary representation (for example, a bit string) of the one or more data segments. In some embodiments, the characteristic value may be a hash value, which may be of a certain length of bits. Various hash algorithms may be applied to calculate the hash value. Examples for calculating the hash value include Message Digest Algorithm 5 (MD5), Secure Hash Algorithm 1 (SHA1), and the like. In addition to the hash value, the characteristic values may be any other values which can uniquely represent the arrangement of bits in a certain length, and the examples thereof are omitted here. As an example, but not a limitation, various embodiments disclosed herein use the hash value as the characteristic value. The tree structure 420 with nodes indicating hash value may also be referred to as a hash tree.

Typically, the tree structure 420 has a plurality of levels, each level having one or more nodes. The root node of the tree structure 420 may be at a lowest level, and the order of the levels of the nodes increases from the root node. For the deepest (highest) level of the nodes from the root node of the tree structure 420, that is, the level of the nodes without child nodes, each node indicates a characteristic value of one different data segment. For a parent node with one or more child nodes, the characteristic value may be determined based on the characteristic value(s) of its child node(s) or directly based on the data segment(s) associated with its child node(s). As such, a parent node indicates a characteristic value of one or more data segments that are associated with its one or more child nodes. A hash chain may be formed from the deepest level to the root level in the case that hash values are calculated as characteristic values.

In some embodiments, the same algorithm is applied for determining the characteristic values, such as the hash values, of all the nodes. In some embodiments, different algorithms may be applied for different nodes, as long as the same algorithm is applied for the corresponding nodes in the two tree structures 420-1, 420-2. It is noted that "corresponding nodes" in the two tree structures 420-1, 420-2 are nodes at the same levels and at the same relative positions within the tree structures.

The nodes of a tree structure 420 are created based on update frequencies of the data segments. More specifically, the nodes of the tree structure 420 are divided into two or more branches from a root node based on the update frequencies of the data segments. As such, starting from the root node, different branches of nodes may be associated with different update frequencies of the data segments. By gathering the nodes according to the update frequencies in the tree structure, the efficiency can be significantly improved due to the virtue of the comparison based on the tree structure with nodes indicating characteristic values. In general, if a node in a tree structure and a node in another tree structure indicate a same characteristic value, it means that each pair of the corresponding child nodes of the two nodes in the two tree structures also indicate a same characteristic value. Accordingly, the data segments corresponding to the nodes are determined to be the same. In view of the above, nodes in branches associated with higher update frequencies of the data segments may be more frequently traversed during the comparison of the data segments.

In some embodiments, to create the tree structure 420, different branches may be designed to have different depths from the root node based on the update frequencies of the corresponding data segments. Such a tree structure 420 is also referred to as an unbalanced tree structure. In some embodiments, one or more frequency thresholds may be set to divide the data segments so as to arrange the corresponding nodes in the tree structure 420. In some embodiments, in the unbalanced tree structure 420, a branch comprising nodes corresponding to data segments with higher update frequencies may have a smaller depth, while a branch comprising nodes corresponding to seldom-changed data segments may have a greater depth. Here, a depth of a branch from a root node of a tree structure may be measured using the number of levels from the root node to the nodes without child nodes. A depth between two nodes of a tree structure may be measured using a total number of levels from a level of one of the two nodes to a level of the other node in the tree structure.

Arranging the nodes of a tree structure into branches with different depths may help further speed up the comparison of the tree structure with another tree structure to localize the different segments. More specifically, since a branch of a smaller depth includes nodes corresponding to the data segments changed more frequently, a smaller number of comparison operations are needed to localize the different segments. Additionally, since a branch of a higher depth nodes are corresponding to data segments changed infrequently, which means that the characteristic values of the nodes are not updated frequently, there is no need to traverse the whole branch before the nodes indicating the same characteristic value are found during the comparison.

Figure 6:
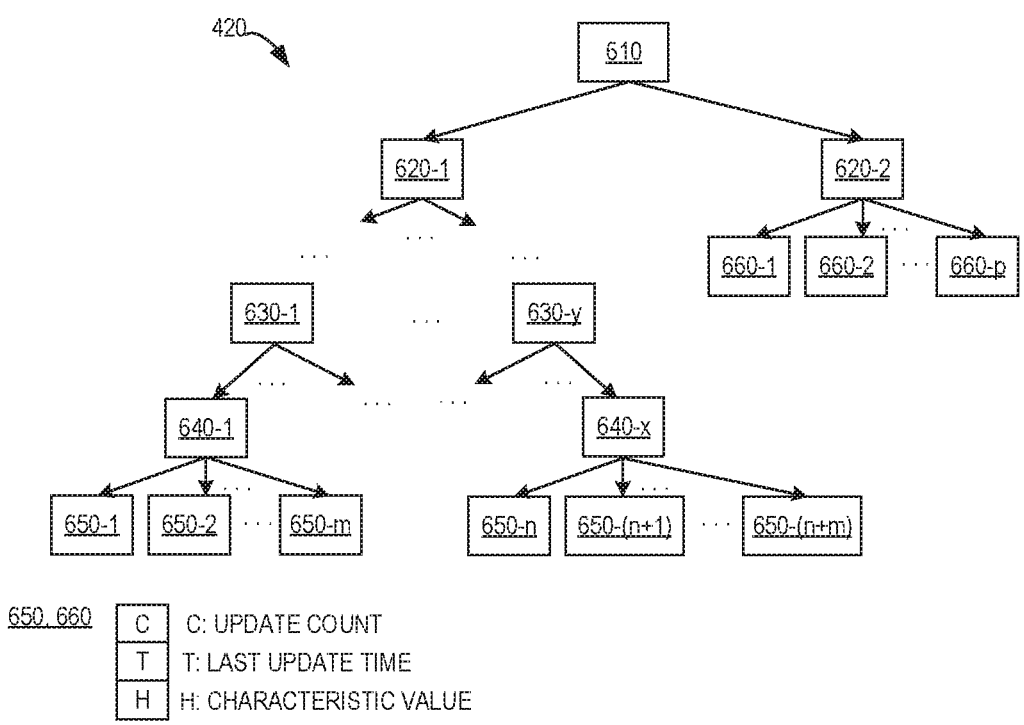
FIG. 6 depicts an example of a tree structure created for database data comparison according to some embodiments of the present disclosure.

FIG. 6 shows an example unbalanced tree structure 420. As illustrated, the tree structure 420 includes a root node 610. In this example, two branches are divided from the root node 610, including a left branch with a node 620-1 and its child nodes, and a right branch with a node 620-2 and its child nodes. Each of the nodes 620-1, 620-2 has a plurality of child nodes, and their child nodes may be parent nodes of further child nodes.

In this example, the left branch associated with the node 620-1 may be associated with relatively lower update frequencies, and the right branch associated with the node 620-2 may be associated with relatively higher update frequencies. The left branch has a greater depth than the right branch. Accordingly, nodes in the left branch indicate characteristic values of data segments changed frequently, for example, having relatively higher update frequencies. Nodes in the right branch indicate characteristic values of data segments changed seldom, for example, having relatively lower update frequencies.

In the example of FIG. 6, the right branch have a three-level depth from the root node 610, where the node 620-2 has a plurality of child nodes 660-1, 660-2, ..., 660-$p$ (collectively or individually referred to as nodes 660), each indicating a characteristic value determined directly from a different data segment that is frequently changed. In the left branch, a greater depth is constructed, and only some example levels and their nodes are depicted.

As shown, nodes 650-1, 650-2, ..., 650-$m$ are child nodes of a node 640-1, each of the nodes 650-1, 650-2, ..., 650-$m$ indicating a characteristic value determined from a different data segment that is seldom changed. The parent node 640-1 indicates a characteristic value determined based on the characteristic values of the child nodes 650-1, 650-2, ..., 650-$m$, or directly based on the data segments corresponding to those child nodes. As such, the parent node 640-1 indicates a characteristic value of a group of data segments corresponding to its child nodes.

A node 640-$x$ at the same level as the node 640-1 has nodes 650-$n$, 650-$(n+1)$, ..., 650-$(n+m)$ as its child nodes, each child node indicating a characteristic value determined from a different data segment. The parent node 640-$x$ indicates a characteristic value that is determined based on the characteristic values of the child nodes 650-$n$, 650-$(n+1)$, ..., 650-$(n+m)$, or determined directly based on the data segments corresponding to those child nodes. The parent node 640-$x$ indicates a characteristic value of a different group of data segments corresponding to its child nodes.

Similarly, at a lower level than the level of the nodes 640-1, ..., 640-$x$, a parent node 630-1 may indicate a characteristic value of a larger group of data segments corresponding to its child nodes, and a parent node 630-$y$ may indicate a characteristic value of a larger group of data segments corresponding to its child nodes. The characteristic values of parent nodes at lower levels are similarly calculated. The root node 610 indicates a characteristic value of all the data segments corresponding to the tree structure 420.

It would be appreciated that the example in FIG. 6 is provided for the purpose of illustration only, without suggesting any limitation to the scope of the present invention. The tree structure 420 may be created with more branches (for example, three or more branches), and the branches may have different number of levels and nodes as compared with those depicted in FIG. 6. In the following, for ease of discussion, the child nodes 650-1, 650-2, ..., 650-$m$, 650-$n$, 650-$(n+1)$, ..., 650-$(n+m)$ are collectively or individually referred to as nodes 650.

The creation of a tree structure 420 has been described above. For each set of data segments in the database data 412-1, 412-2, a corresponding tree structure 420-1, 420-2 may be generated according to some embodiments described above. In some embodiments, the tree structures 420-1, 420-2 may be stored in a system main memory or memories as in-memory data structures, in order to support fast access by the database management system 405. Of course, the tree structures 420-1, 420-2 may be stored in any other suitable manners in other storage devices.

The tree structures 420-1, 420-2 may be partially or entirely obtained by a database management system 405 for comparison so as to determine whether a difference exists between the data segments in the database data 412-1, 412-2. The comparison of the two tree structures 420-1, 420-2 may be performed level by level and node by node from the root nodes. In some embodiments, in the discrete environment, the tree structure 420 maintained at a database management system may be communicated in levels to the other database management system on which the comparison is performed. That is, each time all the node or nodes at one or more levels in the tree structure 420 are provided to the other database management system 405-3 for comparison. The provision may start from the root node.

For any two corresponding nodes at each level, the characteristic values indicated by the nodes are compared with each other. In some embodiments, an Exclusive OR (XOR) operation may be applied on the two characteristic values to determine whether they are the same or different.

In some embodiments, if the root nodes of the two database data 412-1, 412-2 are the same, that is, indicate the same characteristic value, then the database management system 405 may determine that all the concerned data segments in the database data 412-1, 412-2 (those used to generate the tree structures 420-1, 420-2) are the same and no difference is found. In this case, there is no need to traverse the remaining parts of the tree structures 420-1, 420-2. In the discrete environment, the database management system 405-2 or 405-3, at which the comparison is performed, may not need to obtain the remaining parts of the tree structure 420 maintained at the peer database management system 405-3 or 405-2. Thus, the overall communication overhead between the two database management systems 405-2, 405-3 can be reduced as compared with the case where the tree structure is conveyed all at once. This is more beneficial when the tree structure 420 is of larger size.

If the root nodes are different, the database management system 405 continues to compare the child nodes of the root nodes, and so on and so forth. At each level, all the nodes in one tree structure 420-1 are respectively compared with all the corresponding nodes at the same level in another tree structure 420-2. If child nodes of a tree structure maintained at the other database management system 405-2 or 405-3 are not obtained locally, the database management system 405-3 or 405-2 may request for a further part of the tree structure 420 including the child nodes for comparison.

In some embodiments, during the comparison of the tree structures 420-1, 420-2, if two corresponding nodes at the same level are determined to indicate a same characteristic value, it can be determined that the data segment(s) associated with the two nodes are the same. As an example, in FIG. 6, if the nodes 630-1 in two tree structures indicate a same characteristic value, it can be determined that the associated data segments, including those corresponding to the nodes 650-1, 650-2, . . . , 650-$m$, are the same. In such case, all the child nodes of the two nodes in the tree structures 420-1, 420-2 will not be traversed. All the child nodes are not needed to be obtained locally at one time in order to save communication overheads between the two database management systems 405-2, 405-3. For example, if the corresponding nodes 630-1 in two tree structures indicate a same characteristic value, the database management system 405 may not need to go through child nodes of the nodes 630-1 as well as child nodes of the child nodes.

In some embodiments, if two corresponding nodes at the same level in the tree structures 420-1, 420-2 indicate different characteristic values, which means that at least one data segment corresponding to the tree structure 420-1 is different from the corresponding at least one data segment corresponding to the tree structure 420-2. In such case, the database management system 405 may continue to traverse and compare child nodes of the two nodes in order to determine if any corresponding nodes indicating the same characteristic value can be found. If any two nodes indicating the same characteristic value are found, the data segments corresponding to the two nodes are determined to be the same. If the traversal of the tree structures 420-1, 420-2 reaches the nodes without child nodes, characteristic values of those nodes in the two tree structures 420-1, 420-2 are compared and thus, it is possible to localize which data segment(s) are different from the corresponding one(s) of the database data 412-1, 412-2. Through the use of the tree structures 420-1, 420-2, the database management system 405 may provide a comparison result to specifically indicate which data segment(s) of the database data 412-1, 412-2 are the same or different.

The embodiments related to the use of the tree structures 420-1, 420-2 has been described above. In some embodiments, the update frequencies of the data segments may change over time and thus the tree structure 420 may be updated according to the changed update frequencies. The database management system 405 may monitor the update frequencies of the data segments in the database data 412-1, 412-2, for example, by monitoring modification states of the data segments. To facilitate the update of the tree structure 420, information related to the update frequencies of the data segments may be recorded in association with the tree structure 420.

In an embodiment, the nodes in the tree structure 420 without child nodes, such as the nodes 650, 660, may further indicate the information related to the update frequencies of the respective data segments. One example of the nodes 650, 660 is shown in the legend of FIG. 6. As shown, in addition to the characteristic value (represented as "H"), each of the nodes 650, 660 may further indicate the update count of the corresponding data segment (represented as "C") and a timestamp of the last update time of the corresponding segment (represented as "T"). Each time a data segment is modified, the update count "C" may be increased by one, and the time indicating when the data segment is modified may be recorded in the last update time "T". The update count "C" and the last update time "T" may be used to measure how frequently the data segment is updated in the past time. It would be appreciated that the update frequencies of the data segments may be tracked in other manners, for example, by indicating the explicit update frequencies within certain time intervals.

How the tree structure 420 is updated based on the update frequencies of the respective data segments will be described in detail below with reference to FIGS. 7A-9C. It would be appreciated that each of the tree structures 420-1, 420-2 associated with data segments of the database data 412-1, 412-2 can be updated according to those embodiments described. The updating of the tree structures 420-1, 420-2 may be implemented at the database management system 405-1 in the centralized management environment, the tree structures 420-1, 420-2, or implemented respectively at the database management systems 405-2, 405-3 in the discrete management environment.

In some embodiments, nodes in one branch of the tree structure 420 may be moved to another branch if the update frequencies of the associated data segments are changed. More specifically, if an update frequency of a data segment is increased (for example, exceeds a frequency threshold), a node indicating a characteristic value of this data segment in the current branch may be moved to another branch associated with a higher update frequency than the current branch. The other branch is designed for data segments with update frequencies higher than the frequency threshold.

In an opposite case, if an update frequency of a data segment is decreased (for example, to be lower than or equal to another frequency threshold), a node indicating a characteristic value of this data segment in the current branch may be moved to another branch associated with a lower update frequency than the current branch. This other branch is designed for data segments with update frequencies lower than or equal to the other frequency threshold.

Generally, the nodes without child nodes may be moved among the branches of the tree structure 420. After a node is moved from one branch to another branch, the characteristic values of previous and current parent nodes of this node in the two branches are all needed to be updated.

To better understand the movement of the nodes among the branches of the tree structure 420, an example of such update is shown in FIGS. 7A-7D. A part of the tree structure 420 is depicted in the figures for the purpose of illustration only.

In the example of FIGS. 7A-7D as well as examples of FIGS. 8A-9C to be described in the following, the decimal numbers in respective nodes of the tree structure 420 represent the characteristic values indicated by the nodes. The nodes without child nodes indicate information in the same format as shown in the example of nodes 650, 660 in FIG. 6, including the update count, the last update node, and the characteristic value (a hash value in these examples). The hash values of nodes without child nodes are determined based on, for example, MD5 or SHA1. The hash values of parent nodes may be determined according to the $\Sigma H_i$ mod 499, where $H_i$ indicates the hash value indicated by the i-th child node, and mod represents a modulo operation which outputs remainder after division. It would be appreciated that the hash algorithm is merely an example and any other hash algorithms can be applied.

Figure 7A:
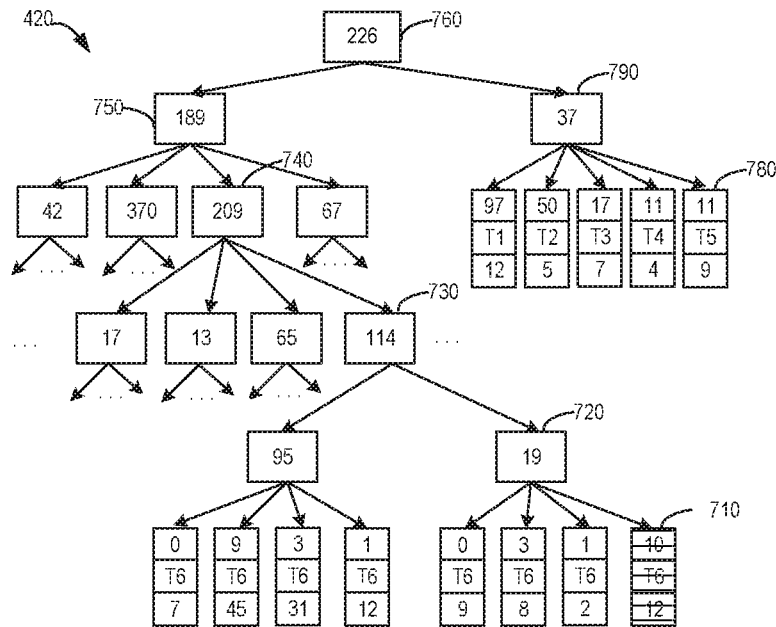
FIGS. 7A-7D depict an example of update of a tree structure according to some embodiments of the present disclosure.

A tree structure 420 is shown in FIG. 7A, where it is detected that a data segment corresponding to a node 710 in the left branch is modified. The node 710 currently indicates that the update count "C" of the data segment is "10," the last update time "T" is "T6," and the hash value of the data segment is "12." In response to the detected modification of the data segment at a timestamp "T7," the database management system 405 may determine whether an interval between the current timestamp "T7" and the current last update time "T6" is below a predetermined interval threshold, which may be preconfigured as several days, a week, a month, and the like. The comparison with the predetermined interval threshold is to ensure that the update count "C" also records the total number of updates of the data segment within the predetermined interval threshold.

Figure 7B:
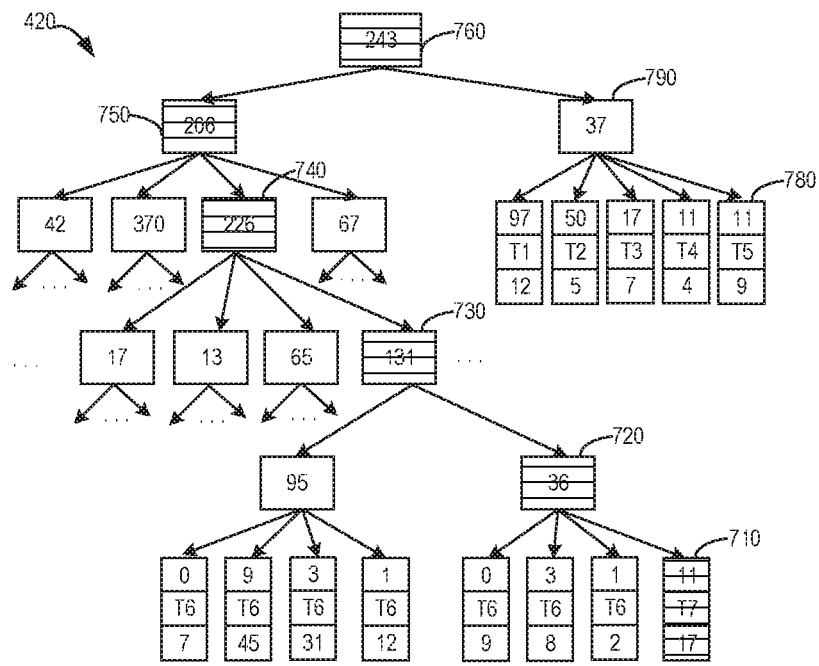

If the interval between the timestamp "T7" and the timestamp "T6" is below the interval threshold, the update count "C" is changed from "10" to "11," the last update time is changed to be a timestamp "T7" indicating the time when the data segment is modified, and the hash value is also changed to be "17" which is calculated based on the modified data segment, as shown in FIG. 7B. Due to the change of the hash value of the node 710, the hash values of the parent nodes at the lower levels are also changed, including nodes 720, 730, 740, 750 as well as the root node 760.

As the update count "C" is changed, the database management system 405 determines whether the update count "C" exceeds a predetermined count threshold for moving nodes among the branches, such as "10." As mentioned above, by setting the interval threshold, it is possible to make sure that the update count "T" of each data segment always indicates the total number of updates within a same interval threshold. As such, the update counts T" of the data segments can be used to indicate their update frequencies within the same interval threshold. By simply comparing the update count of one data segment with the count threshold, it is possible to determine whether the update frequency of this data segment is higher than or lower than a frequency threshold.

In some embodiments, if the update count "C" exceeds the count threshold, it means that the data segment changes frequently for some time past. Thus, the database management system 405 decides to move the node 710 from the left branch to the right branch of the tree structure 420, as shown in FIG. 7C.

In the right branch, a further level of nodes is constructed with a new parent node 770 added. The node 710 and a node 780 that is previously located in the right branch are all created as child nodes of the parent node 770. It would be appreciated that FIG. 7C merely illustrates an example of the arrangement of the node 710 after it is moved to the right branch. The arrangement of the node 710 in the right branch is flexible. As another example, the node 710 may be moved to the right branch as a child node of the existing parent node 790.

Figure 7C:
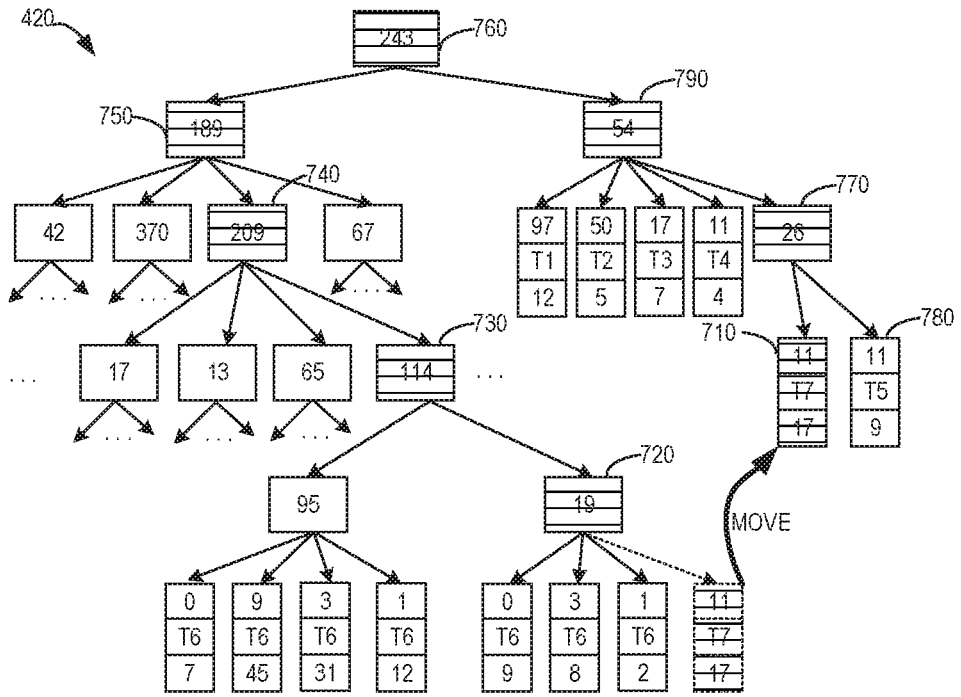
Figure 7D:
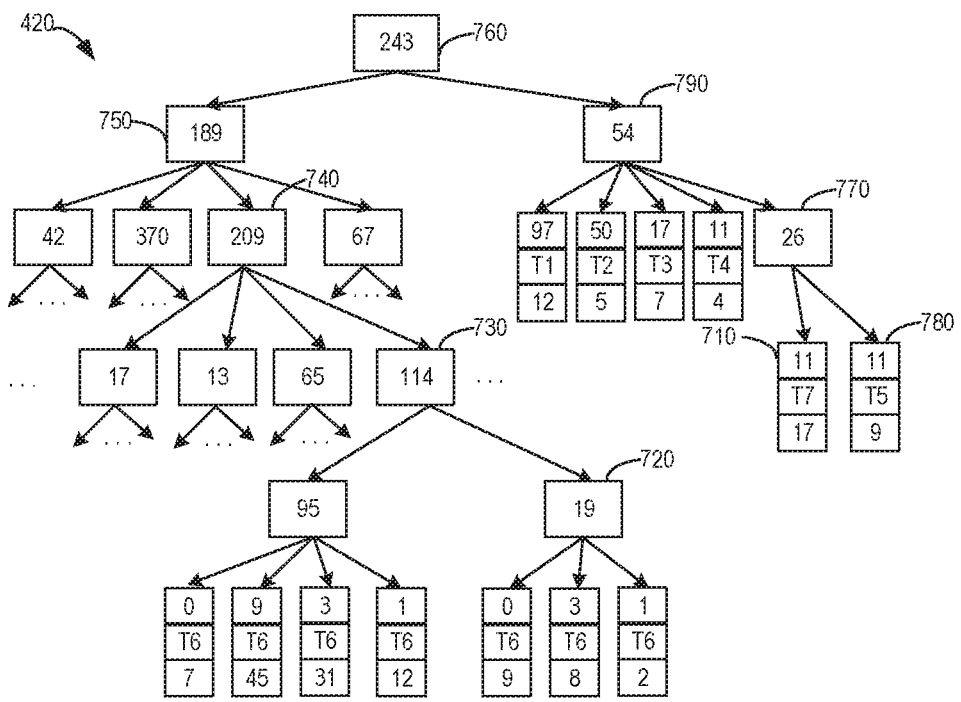

As the node 710 is moved, hash values of the previous parent nodes of this node 710 in the left branch, including the nodes 720, 730, 740, 750 are updated, as shown in FIG. 7C. Hash values of the current parent nodes of the node 710, including nodes 770 and 790 are also updated or determined due to the addition of the node 710, as shown in FIG. 7C. The root node 760 is not updated as the whole set of data segments are not updated but only the locations of its child nodes changed. The resulting tree structure 420 after the movement is illustrated in FIG. 7D.

The movement of a node due to the increasing of the update frequency is illustrated in FIGS. 7A-7D. For the case where the update frequency is decreased to be lower than a corresponding frequency threshold, similar node movement may also be performed.

Figure 8A:
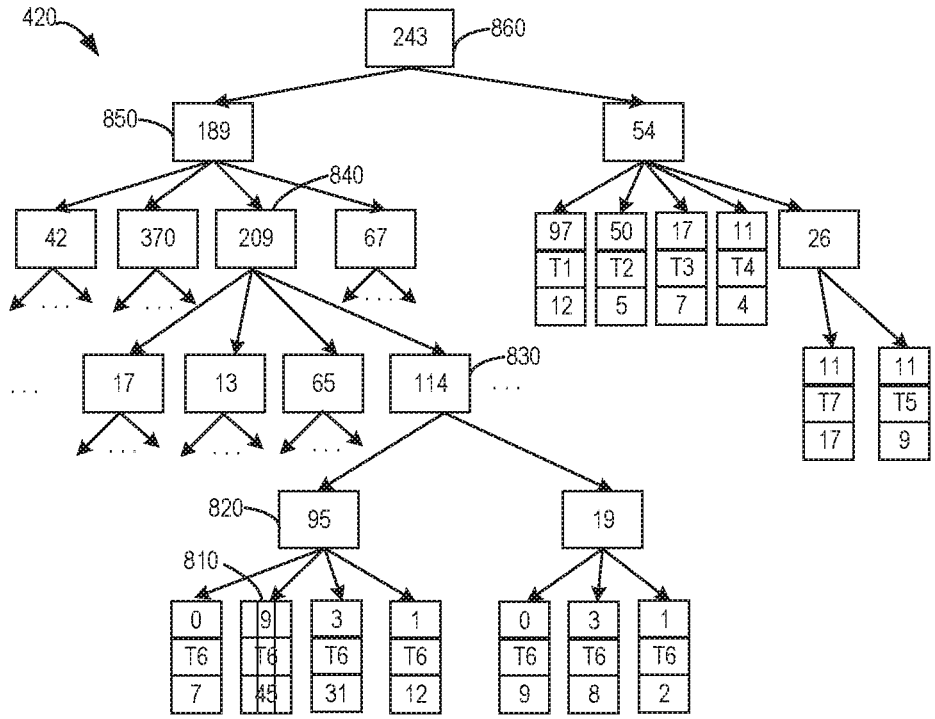
FIGS. 8A-8B depict a further example of update of a tree structure according to some embodiments of the present disclosure.
Figure 8B:
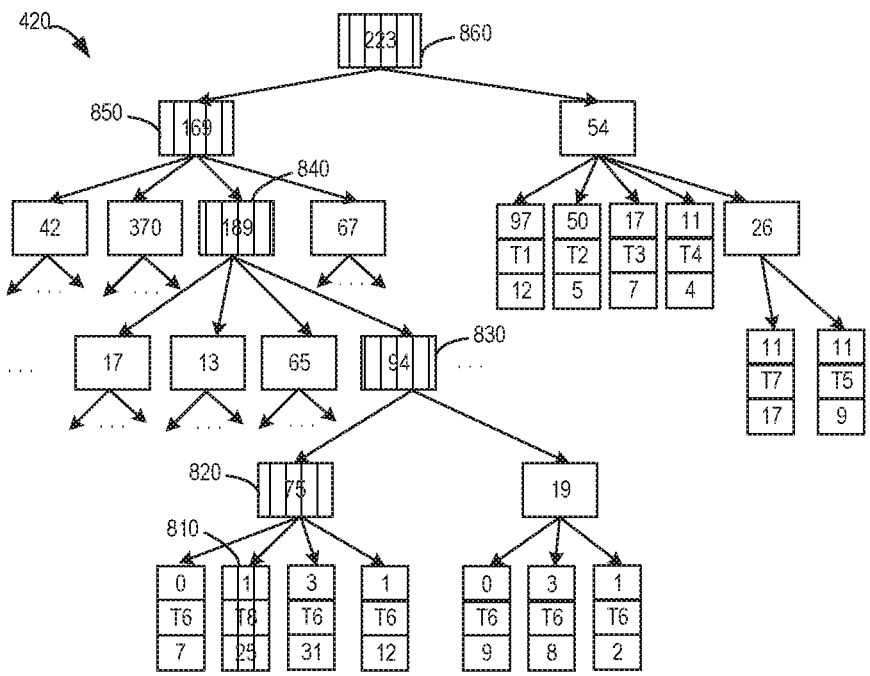

In some embodiments, if a modification of a data segment does not lead to the update frequency exceeding or being below a predetermined frequency threshold, the information related to the update frequency, such as the update count "C" and the last update time "T," are updated but the associated node is not adjusted. FIGS. 8A-8B show such an example. FIG. 8A shows a tree structure 420, where it is detected that a data segment corresponding to a node 810 in the left branch is modified. The node 810 currently indicates that the update count "C" of the data segment is "9," the last update time "T" is "T6," and the hash value of the data segment is "45."

In response to the detected modification of the data segment at a timestamp "T8," the database management system 405 may determine whether an interval between the current timestamp "T8" and the current last update time "T6" is below the predetermined interval threshold. If the interval between the timestamp "T8" and the timestamp "T6" exceeds the interval threshold, it means that the data segment is not changed for a long time (longer than the interval threshold). In this case, the database management system 405 may reset the update count "C" to be "1" and the last update time "T" to be "T8," as shown in FIG. 8B, in order to make sure that the recorded update count "T" always indicates the total number of updates within the interval threshold. The hash value is also updated as "25" based on the modified data segment. Due to the change of the hash value of the node 810, the hash values of the parent nodes at the lower levels are also changed, including nodes 820, 830, 840, 850 as well as the root node 860.

In some embodiments, nodes of the tree structure 420 may be adjusted among levels within a branch according to one or more changes detected on the update frequencies of the data segments. More specifically, it is expected that a node associated with a data segment with a higher update frequency has a lower depth from the root node. If an update frequency of a data segment is changed to be greater than an update frequency of another data segment and nodes associated with the two data segments and having no child nodes are at different levels in one branch, the two nodes may be swapped with each other. As a result of the swapping, the node associated with the data segment having a higher update frequency may be closer to the root node, that is, the depth from the root node to this node may be lowered due to the swapping.

Figure 9A:
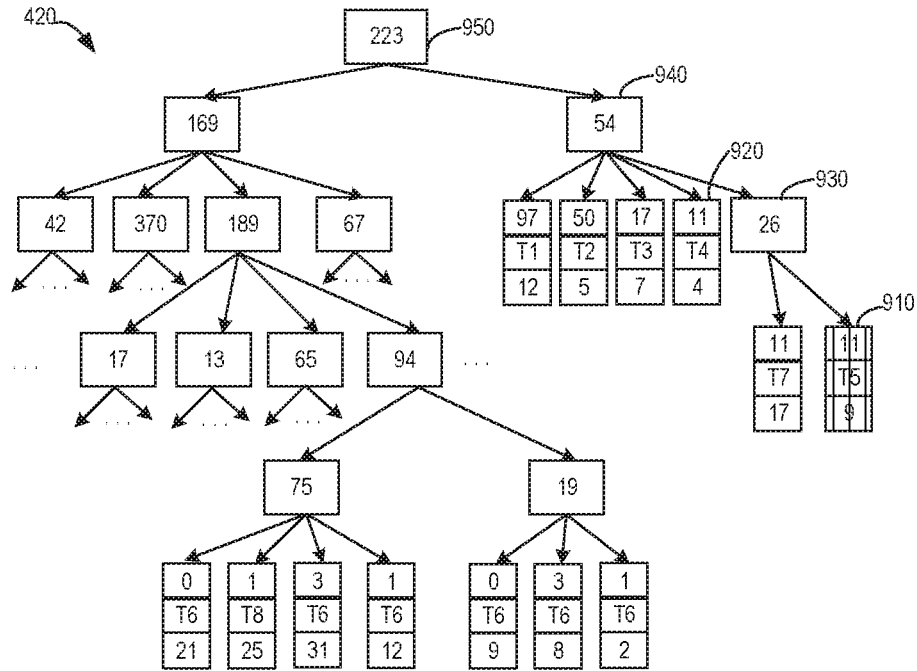
FIGS. 9A-9C depict a yet further example of update of a tree structure according to some embodiments of the present disclosure.
Figure 9B:
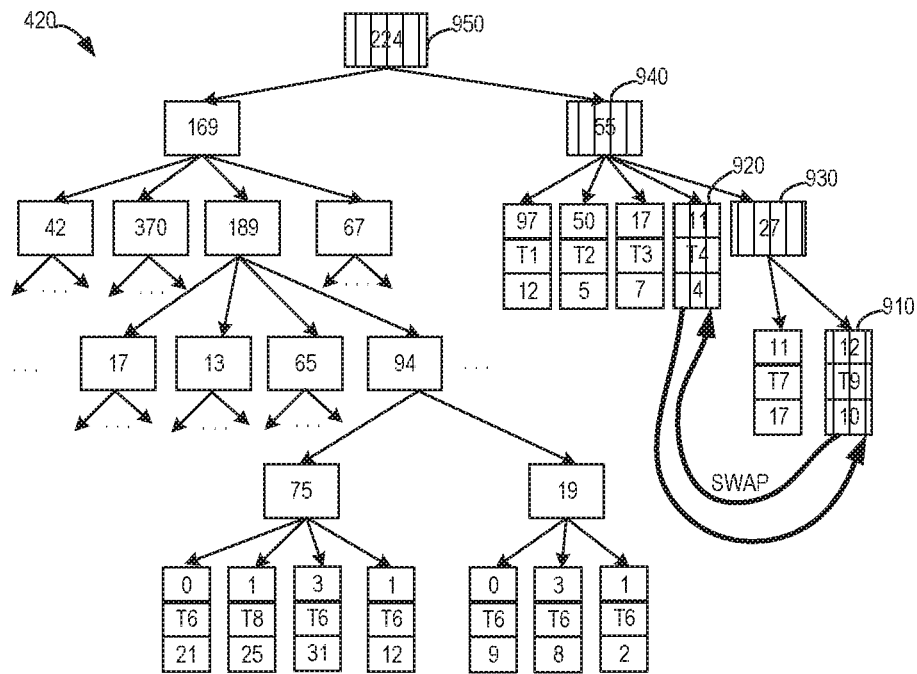
Figure 9C:
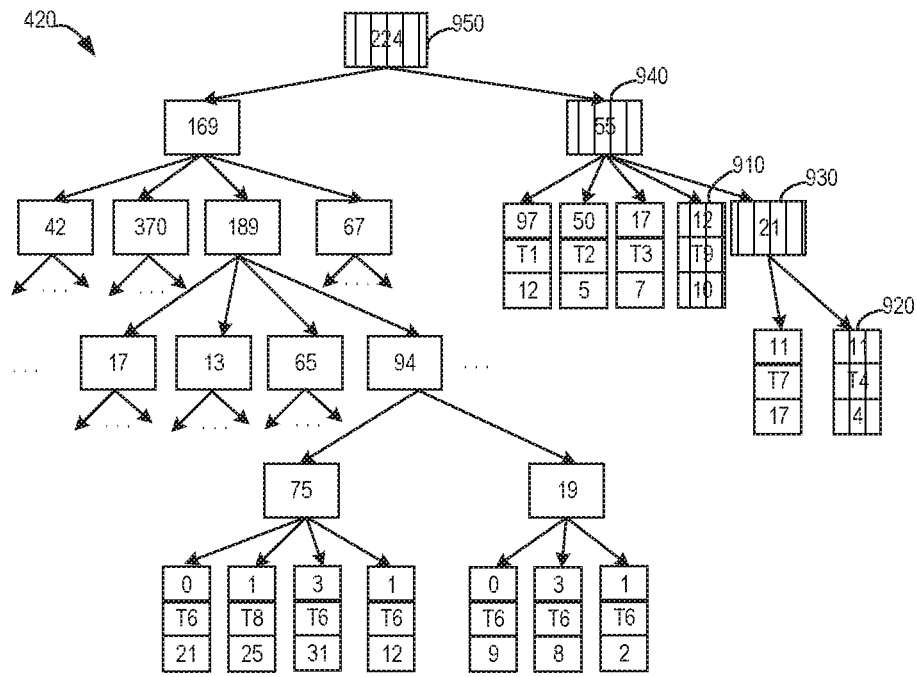

To better understand the swapping of the nodes in the tree structure 420, an example of such update is shown in FIGS. 9A-9C. A tree structure 420 is shown in FIG. 9A, where it is detected that a data segment corresponding to a node 910 in the left branch is modified. The node 910 currently indicates that the update count "C" of the data segment is "11," the last update time "T" is "T5," and the hash value of the data segment is "9." In response to the detected modification of the data segment at a timestamp "T9," the database management system 405 may determine whether an interval between the current timestamp "T9" and the current last update time "T5" is below a predetermined interval threshold.

If the interval between the timestamp "T9" and the timestamp "T5" is below the interval threshold, the update count "C" is changed from "11" to "12," the last update time is changed to be a timestamp "T9" indicating the time when the data segment is modified, and the hash value is also changed to be "10" which is calculated based on the modified data segment, as shown in FIG. 9B. Due to the change of the hash value of the node 910, the hash values of the parent nodes at the lower levels are also changed, including nodes 930, 940 as well as the root node 950.

As the update count "C" is changed, the database management system 405 determines whether the update count "C" of the node 910 is greater than the update count "C" of a node at a lower level. If it is determined that the update count "C" of the node 910 is greater than the update count "C" of the node 920 in FIG. 9B, the database management system 405 may decide to swap the two nodes. The resulting of the swapping is illustrated in FIG. 9C. The parent nodes of the nodes 910 and 920, including the nodes 930, 940 as well as the root node 950 are updated. It is noted that depending on the hash algorithm used for calculating the hash values of the nodes 940, 950, their hash values are not changed as compared with FIG. 9B because the corresponding data segments are not changed while only the locations of the child nodes are re-arranged.

In some embodiments, instead of swapping the nodes at different levels as explicitly illustrated in the example of FIGS. 9A-9C, the database management system 405 may move a node from a higher level to a lower level such that the depth from the root node to the moved node is described. For example, the database management system 405 may determine whether the update count "C" of the node 910 exceeds a predetermined count threshold (for example, 11). If the update count "C" of the node 910 exceeds the count threshold, the database management system 405 may move the node 910 to be a child node of the node 940. After the moving, the previous parent node 930 and the current parent nodes 940, 950 are also updated.

Figure 10:
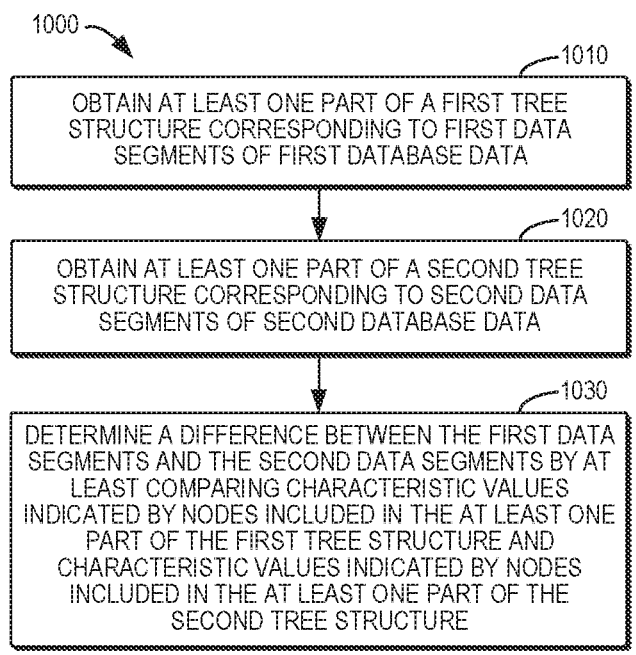
FIG. 10 depicts a flowchart of an example method according to some embodiments of the present disclosure.

FIG. 10 shows a flowchart of an example method 1000 according to some embodiments of the present disclosure. The method 1000 can be implemented at a database management system 405 as shown in FIGS. 4A-4B. For the purpose of discussion, the method 1000 will be described from the perspective of the database management system 405 with reference to FIGS. 4A-4B.

At block 1010, the database management system 405 obtains at least one part of a first tree structure corresponding to first data segments of first database data. Each node of the first tree structure indicates a characteristic value of at least one of the first data segments, and nodes of the first tree structure are divided into a first plurality of branches from a first root node based on update frequencies of the first data segments. At block 1020, the database management system 405 obtains at least one part of a second tree structure corresponding to second data segments of second database data. Each node of the second tree structure indicates a characteristic value of at least one of the second data segments, and nodes of the second tree structure are divided into a second plurality of branches from a second root node based on update frequencies of the second data segments. At block 1030, the database management system 405 determines a difference between the first data segments and the second data segments by at least comparing characteristic values indicated by nodes included in the at least one part of the first tree structure and characteristic values indicated by nodes included in the at least one part of the second tree structure.

In some embodiments, the at least one part of the first tree structure comprises a first node and the at least one part of the second tree structure comprises a second node corresponding to the first node, and determining the difference between the first data segments and the second data segments comprises: in accordance with a determination that the first node and the second node indicate a same characteristic value, determining that at least one of the first data segments corresponding to the first node is the same as at least one of the second data segments corresponding to the second node; and in accordance with a determination that the first node and the second node indicate different characteristic values, determining that the at least one of the first data segments is different from the at least one of the second data segments.

In some embodiments, the first and second nodes have child nodes in the first and second tree structures, respectively. In some embodiments, determining the difference between the first data segments and the second data segments further comprises: in accordance with the determination that the first node and the second node indicate the same characteristic value, ceasing to compare the child nodes of the first and second nodes; and in accordance with the determination that the first node and the second node indicate the different characteristic values, if at least one of the child nodes is absent from the at least one part of the first tree structure and the at least one part of the second tree structure, obtaining a further part of the at least one of the first and second tree structures comprising the at least one child node, and if all the child nodes are included in the at least one part of the first tree structure and the at least one part of the second tree structure, comparing the child nodes of the first and second nodes.

In some embodiments, respective depths of the first plurality of branches are based on update frequencies of the first data segments, and respective depths of the second plurality of branches are based on update frequencies of the second data segments.

In some embodiments, the method 1000 further comprises monitoring the update frequencies of the first data segments and the second data segments; and updating the first tree structure or the second tree structure based on a detected change on at least one of the update frequencies.

In some embodiments, updating the first tree structure or the second tree structure comprises: in accordance with a detection that an update frequency of a first data segment of the first or second data segments is increased to exceed a first frequency threshold, moving a first child node in a first branch to a second branch of the first or second plurality of branches, the first child node indicating a characteristic value of the first data segment and having no child node, and a depth of the second branch being smaller than a depth of the first branch, in accordance with a detection that the update frequency of the first data segment is decreased to be below a second frequency threshold, moving the first child node in the first branch to a third branch of the first or second plurality of branches, the third branch being associated with a lower update frequency than the first branch, and updating characteristic values of parent nodes of the first child node in the first and second branches of the first or second tree structure.

In some embodiments, updating the first tree structure or the second tree structure further comprises: in accordance with a detection that an update frequency of a second data segment is changed to be greater than an update frequency of a third data segment of the first or second data segments, swapping a second child node and a third child node in the first or second tree structure, the second and third child nodes indicating characteristic values of the second and third data segments respectively and having no child node, and a depth from the first or second root node to the third child node being smaller than a depth from the first or second root node to the second child node, and updating parent nodes of the second and third child nodes in the first or second tree structure.

In some embodiments, the first data segments comprise at least a subset of data items in rows or columns of tables of the first database data, and the second data segments comprise at least a subset of data items in rows or columns of tables of the second database data.

In some embodiments, the respective characteristic values comprise hash values.

It should be noted that the processing of comparison of database data or the database management system 405 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The manner in which "data segments" are typically defined will now be discussed. The cells of a given segment should typically be chosen to be historical queries used by customers of the database management service (DBMS). By checking for identicality between two tabular databases using customer queries in this manner, identicality is checked with respect to only a portion of the respective tables, but the portions that are checked will strongly tend to be the portions of the respective tables that the customer is likely to be interested in. A strength of this kind of approach is that it balances: (i) computational and/or time efficiency (that, is checking only a part of the table instead of checking the entire table); and (ii) accuracy (that is, it is possible that differences in the tables exist, but these differences are not likely to impact the customer because they do not lie in the parts of the table that the customer has historically queried).

An example will now be discussed. It is a an SQL catalog COLUMN view. If it is desired to compare all the attributes of the columns, the machine logic of an embodiment of the present invention chooses all the cells by the following SQL statement: "select * from SYSCOLUMNS. If it is only desired to compare the attribute ColumnName of the columns belonging to Tb12, then the machine logic of the embodiment only needs one cell by SQL statement as follows: select ColumnName from SYSCOLUMNS where TableName='Tb12'."

The respective operations of another example of a method according to the present invention will be respectively discussed in the following paragraphs. This method determines whether two databases are at least partially identical, or, alternatively, whether the two databases have at least one discrepancy.

RECEIVE IDENTIFICATION OF THE TWO DATABASES: First, machine logic of an embodiment of a computer system according to an embodiment of the present invention receives an identification of two databases that are desired to be compared. Both of these databases are set up to service a common customer who regularly queries one, or both, of the two databases. Note that in this embodiment, it is the identity of the two databases that are received and not all the values of the databases themselves—in many embodiments, these databases hold an enormous number of values. Alternatively, if the database itself is received, then that is one way of receiving the "identity" of the database. Also, in this embodiment, the two tabular databases have the same row and column structure (that is, the same set of key values, which is to say, rows, and the same set of fields, which is to say, columns). Accordingly, in this example, the two databases are two versions of the same database. Alternatively, the two databases may have different rows and columns, so long as there are enough rows and columns in common so that either of the two databases can be meaningfully queried by the customer.

RECEIVE HISTORICAL CUSTOMER QUERIES: In this embodiment, the customer's ten (10) most popular historical queries are received. In this embodiment, the most popular ten (10) queries are the most popular with respect to both versions of the database.

DEFINE DATA SEGMENTS: The machine logic of the computer system of this embodiment uses the ten (10) most popular queries to define ten (10) respectively corresponding data segments. As is typical of database queries, each of these ten (10) queries respectively implicates a common subset of cells of the database tables—in other words, each data segment is a subset of cells of the two tabular databases (in this example, two versions of the same database).

COMPARE THE DATA SEGMENTS OF THE TWO DATABASES: The machine logic of the computer system of this embodiment uses the ten (10) data segments to define which cells of the respective databases are compared against each other. In this example, the values of the subset of cells of the ten (10) data segments are accessed from the databases themselves and directly compared against each other. Alternatively, other embodiments may use certain proxy measures for comparing the cell values, such as comparison of hashtags values based on each data segment or last update time/date of the respective cell pairs under comparison. In some embodiments, and as discussed above in detail, a hierarchical data structure including nodes respectively corresponding to data segments may be used to accomplish the comparison of the common subset of cells defined by the data segments. When the subset of cells are compared, the comparison result obtained will either be: (A) IDENTICAL; or (B) NOT-IDENTICAL (that is, the subset of cells have at least one discrepancy).

BRANCH A—IDENTICAL: If the subsets are determined to be identical, then the tables are deemed to be identical, and an appropriate response action is taken in response to this finding. Some examples of possible responsive actions are: (i) delay updating and/or synchronization of one database with respect to the other; (ii) allow customer to keep using database it has been using (in this example, the first version of the database); and/or (iii) switch customer from one database to the other (in this example, switch the customer's queries from the first version of the database to the second version of the database). The choice of responsive action may be impacted by the identity of the database considered to be more current.

BRANCH B—NOT-IDENTICAL: If the subsets are determined to be unidentical, then an appropriate response action is taken in response to this finding. Some examples of possible responsive actions are: (i) immediately perform updating and/or synchronization of one database with respect to the other; and/or (ii) switch customer from one database to the other (in this example, switch the customer's queries from the first version of the database to the second version of the database). The choice of responsive action may be impacted by the identity of the database considered to be more current.

What is claimed is:

1. A computer-implemented method (CIM) comprising:
storing a first tree structure including nodes and connections between the nodes with ordered levels from highest to lowest, where each node of the first tree structure corresponds to a respective hash value of a data record in a first version of a database, wherein the nodes are arranged in branches extending from a root node and are respectively assigned to one of the branches based on an updating frequency of a database record associated with a respective one of the nodes;
receiving a first updating frequency value for a first database record of the first version of the database;
determining that the first updating frequency value exceeds a first threshold;
responsive to the determination that the first updating frequency value exceeds the first threshold, updating the first tree structure by moving a first node corresponding to the hash value of the first database record from a first level of the ordered levels to a second level of the ordered levels, with the second level being a higher level of the first tree structure than the first level is; and
traversing the first tree structure when performing a comparison of the hash value corresponding to the first node to determine any discrepancy between the first version of the database with a second tree structure corresponding to a second version of the database.

2. The CIM of claim 1, wherein the comparison of the hash value is automatically initiated by a computer system in response to at least one event occurring, the at least one event being selected from a group consisting of a recovery of storage nodes storing the first version and the second version of the database, data replication or backup performed between storage nodes storing the first version and the second version of the database, and one or more user queries.

3. The CIM of claim 1, wherein the first version of the database includes an additional portion with an updating frequency value lower than a second predetermined threshold, and in response to the updating frequency value being lower than a second predetermined threshold, information of the additional portion is not selected for use in the first tree structure.

4. The CIM of claim 1, wherein the second level of the first tree structure is closer to a root node of the first tree structure than the first level is.

5. The CIM of claim 1, wherein the first tree structure is an unbalanced tree structure.

6. The CIM of claim 1, wherein within the first tree structure, one or more nodes of a higher level include a value calculated from respective values of child nodes of the respective one or more nodes of the higher level.

7. The CIM of claim 1, wherein the first node is a child node within the first tree structure, and
wherein the traversing of the first tree structure when performing the comparison of the hash value corresponding to the first node with the second tree structure occurs in response to a determination that a hash value for a parent node of the child node does not match a hash value of a correspondingly-positioned parent node of the second tree structure.

8. A computer program product comprising:
a non-transitory machine-readable storage medium; and
machine-executable instructions stored on the non-transitory machine-readable storage medium, wherein the machine-executable instructions when executed by a processor cause the processor to perform a method comprising:
storing a first tree structure including nodes and connections between the nodes with ordered levels from highest to lowest, where each node of the first tree structure corresponds to a respective hash value of a data record in a first version of a database, wherein the nodes are arranged in branches extending from a root node and are respectively assigned to one of the branches based on an updating frequency of a database record associated with a respective one of the nodes;
receiving a first updating frequency value for a first database record of the first version of the database;
determining that the first updating frequency value exceeds a first threshold; and
responsive to the determination that the first updating frequency value exceeds the first threshold, updating the first tree structure by moving a first node corresponding to the hash value of the first database record from a first level of the ordered levels to a second level of the ordered levels, with the second level being a higher level of the first tree structure than the first level is; and
traversing the first tree structure when performing a comparison of the hash value corresponding to the first node to determine any discrepancy between the first version of the database with a second tree structure corresponding to a second version of the database.

9. The computer program product of claim 8, wherein the comparison of the hash value is automatically initiated by a computer system in response to at least one event occurring, the at least one event being selected from a group consisting of a recovery of storage nodes storing the first version and the second version of the database, data replication or backup performed between storage nodes storing the first version and the second version of the database, and one or more user queries.

10. The computer program product of claim 8, wherein the first version of the database includes an additional portion with an updating frequency value lower than a second predetermined threshold, and in response to the updating frequency value being lower than a second predetermined threshold, information of the additional portion is not selected for use in the first tree structure.

11. The computer program product of claim 8, wherein the second level of the first tree structure is closer to a root node of the first tree structure than the first level is.

12. The computer program product of claim 8, wherein the first tree structure is an unbalanced tree structure.

13. The computer program product of claim 8, wherein within the first tree structure, one or more nodes of a higher level include a value calculated from respective values of child nodes of the respective one or more nodes of the higher level.

14. The computer program product of claim 8, wherein the first node is a child node within the first tree structure, and
wherein the traversing of the first tree structure when performing the comparison of the hash value corresponding to the first node with the second tree structure occurs in response to a determination that a hash value for a parent node of the child node does not match a hash value of a correspondingly-positioned parent node of the second tree structure.

15. A computer system comprising:
a processor; and
a memory coupled to the processor and storing instructions thereon, the instructions, when executed by the processor, performing a method comprising:
    storing a first tree structure including nodes and connections between the nodes with ordered levels from highest to lowest, where each node of the first tree structure corresponds to a respective hash value of a data record in a first version of a database, wherein the nodes are arranged in branches extending from a root node and are respectively assigned to one of the branches based on an updating frequency of a database record associated with a respective one of the nodes;
    receiving a first updating frequency value for a first database record of the first version of the database;
    determining that the first updating frequency value exceeds a first threshold; and
    responsive to the determination that the first updating frequency value exceeds the first threshold, updating the first tree structure by moving a first node corresponding to the hash value of the first database record from a first level of the ordered levels to a second level of the ordered levels, with the second level being a higher level of the first tree structure than the first level is; and
    traversing the first tree structure when performing a comparison of the hash value corresponding to the first node to determine any discrepancy between the first version of the database with a second tree structure corresponding to a second version of the database.

16. The computer system of claim 15, wherein the comparison of the hash value is automatically initiated by a computer system in response to at least one event occurring, the at least one event being selected from a group consisting of a recovery of storage nodes storing the first version and the second version of the database, data replication or backup performed between storage nodes storing the first version and the second version of the database, and one or more user queries.

17. The computer system of claim 15, wherein the first version of the database includes an additional portion with an updating frequency value lower than a second predetermined threshold, and in response to the updating frequency value being lower than a second predetermined threshold, information of the additional portion is not selected for use in the first tree structure.

18. The computer system of claim 15, wherein the second level of the first tree structure is closer to a root node of the first tree structure than the first level is.

* * * * *